(12) United States Patent
Noh

(10) Patent No.: US 11,249,510 B2
(45) Date of Patent: Feb. 15, 2022

(54) SEMICONDUCTOR APPARATUS WITH DOMAIN CROSSING FUNCTION

(71) Applicant: SK hynix Inc., Icheon-si (KR)

(72) Inventor: Hyun Jin Noh, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 141 days.

(21) Appl. No.: 16/222,778

(22) Filed: Dec. 17, 2018

(65) Prior Publication Data

US 2019/0361487 A1    Nov. 28, 2019

(30) Foreign Application Priority Data

May 24, 2018   (KR) .................. 10-2018-0059180

(51) Int. Cl.
*G06F 1/12* (2006.01)
*G06F 13/42* (2006.01)
*H04L 5/00* (2006.01)

(52) U.S. Cl.
CPC ..................................... *G06F 1/12* (2013.01)

(58) Field of Classification Search
CPC ........................................................ G06F 1/12
See application file for complete search history.

(56) References Cited

U.S. PATENT DOCUMENTS

| 9,832,336 | B2 * | 11/2017 | Kusunoki | H04N 1/047 |
| 10,075,153 | B2 * | 9/2018 | Shin | H03K 5/135 |
| 2005/0195894 | A1 * | 9/2005 | Kim | H04L 25/03019 |
| | | | | 375/232 |
| 2010/0095056 | A1 * | 4/2010 | Okada | G06F 13/1605 |
| | | | | 711/104 |

FOREIGN PATENT DOCUMENTS

| KR | 1020160081808 A | 7/2016 |
| KR | 1020170093617 A | 8/2017 |

* cited by examiner

*Primary Examiner* — Mohammed H Rehman
(74) *Attorney, Agent, or Firm* — William Park & Associates Ltd.

(57) ABSTRACT

A semiconductor apparatus may include a first semiconductor apparatus configured to transmit a first input signal as first data in synchronization with a first edge of a first clock signal having a first frequency. The semiconductor apparatus may also include a second semiconductor apparatus including: a first storage unit, configured to receive the first data as a set signal and output a second input signal as an internal signal in synchronization with a first edge of a second clock signal having a second frequency; and a second storage unit, configured to output the internal signal as second data in synchronization with a second edge of the second clock signal.

10 Claims, 3 Drawing Sheets

SEMICONDUCTOR APPARATUS WITH DOMAIN CROSSING FUNCTION

CROSS-REFERENCES TO RELATED APPLICATION

The present application claims priority under 35 U.S.C. § 119(a) to Korean application number 10-2018-0059180, filed on May 24, 2018, in the Korean Intellectual Property Office, which is incorporated herein by reference in its entirety.

BACKGROUND

1. Technical Field

Various embodiments generally relate to a semiconductor circuit, and more particularly, to a semiconductor apparatus with a domain crossing function.

2. Related Art

In a semiconductor apparatus, a clock signal used on a transmitter side may have a different frequency from a clock signal used on a receiver side.

When the clock signals used on the transmitter side and the receiver side have different frequencies, a signal received by the receiver side may not have a value of '0' or '1'. Then, the semiconductor apparatus may be trapped in a metastable state so as not to recognize the corresponding signal. In this case, the semiconductor apparatus might not perform a normal receiving operation.

Therefore, when the transmitter side and the receiver side have different clock domains, the receiver-side circuit requires a circuit for removing a frequency difference between the clock signals.

SUMMARY

In accordance with the present teachings, a semiconductor apparatus may include a first semiconductor apparatus configured to transmit a first input signal as first data in synchronization with a first edge of a first clock signal having a first frequency. The semiconductor apparatus may also include a second semiconductor apparatus including: a first storage unit, configured to receive the first data as a set signal and output a second input signal as a first internal signal in synchronization with a first edge of a second clock signal having a second frequency; and a second storage unit, configured to output the internal signal as second data in synchronization with a second edge of the second clock signal.

Also in accordance with the present teachings, a semiconductor apparatus may include a first semiconductor apparatus configured to transmit a first input signal as first data in synchronization with a first edge of a first clock signal having a first frequency. The semiconductor apparatus may also include a second semiconductor apparatus including: a first storage unit, configured to receive the first data as a set signal and output a second input signal as an internal signal in synchronization with a first edge of a second clock signal having a second frequency; a second storage unit, configured to output the first internal signal as a second internal signal in synchronization with the first edge of the second clock signal; and an edge detection circuit, configured to generate second data by detecting a first edge of the second internal signal according to the second clock signal.

DETAILED DESCRIPTION

Hereinafter, a semiconductor apparatus with a domain crossing function according to the present disclosure is described below with reference to the accompanying drawings through exemplary embodiments. Various embodiments are directed to a semiconductor apparatus with a domain crossing function, which can improve signal receiving performance while reducing latency related to signal reception.

Figure 1:
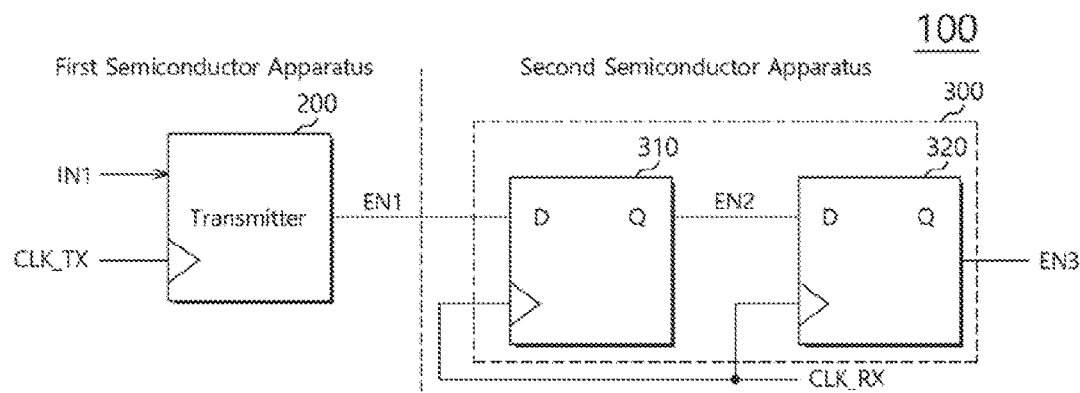
FIG. 1 illustrates a configuration of a semiconductor apparatus with a domain crossing function, in accordance with an embodiment.

FIG. 1 illustrates the configuration of a semiconductor apparatus 100 with a domain crossing function, in accordance with an embodiment of the present teachings.

As illustrated in FIG. 1, the semiconductor apparatus 100 may include a first semiconductor apparatus and a second semiconductor apparatus.

The first semiconductor apparatus may include a transmitter 200, and the second semiconductor apparatus may include a receiver 300.

The transmitter 200 may generate first data EN1 by latching a first input signal IN1 according to a transmitter-side clock signal, i.e. a first clock signal CLK_TX.

The receiver 300 may receive an external signal (i.e. the first data EN1 of the transmitter 200 according to a receiver-side clock signal (i.e. a second clock signal CLK_RX)), generate second data EN3, and transfer the second data EN3 to a circuit of the second semiconductor apparatus including the receiver 300.

For example, the first clock signal CLK_TX may have a first frequency, and the second clock signal CLK_RX may have a second frequency.

The second frequency may be higher than the first frequency.

The receiver 300 may include first and second storage units 310 and 320.

Each of the first and second storage units 310 and 320 may include a flip-flop. For example, the first and second storage units 310 and 320 represent first and second flip-flops, respectively, of the receiver 300.

The first storage unit 310 may receive the first data EN1 of the transmitter 200 according to the second clock signal CLR_RX and may generate an output signal EN2.

The second storage unit 320 may receive the output signal EN2 of the first storage unit 310 according to the second clock signal CLK_RX and may generate the second data EN3.

The receiver 300 can latch the first data EN1 of the transmitter 200 through the first and second storage units 310 and 320 at the rising edges of different clock pulses of the second clock signal CLK_RX, thereby preventing a metastable state, which may occur depending on a frequency difference between the first and second clock signals CLK_TX and CLK_RX.

Figure 2:
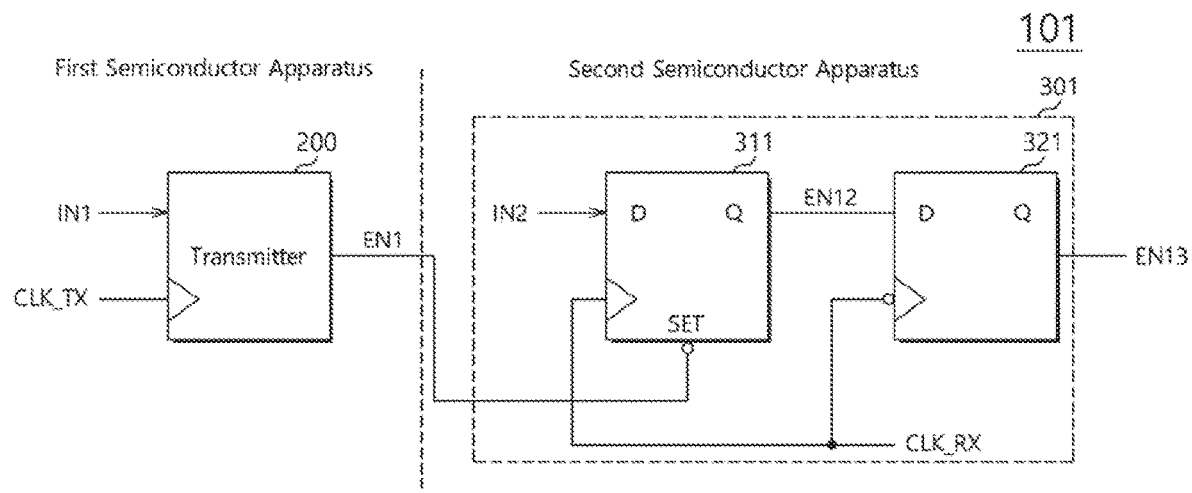
FIG. 2 illustrates a configuration of a semiconductor apparatus with a domain crossing function, in accordance with an embodiment.

FIG. 2 illustrates the configuration of a semiconductor apparatus 101 having a domain crossing capability, in accordance with another embodiment.

As illustrated in FIG. 2, the semiconductor apparatus 101 may include a first semiconductor apparatus and a second semiconductor apparatus.

The first semiconductor apparatus may include a transmitter 200, and the second semiconductor apparatus may include a receiver 301.

The first clock signal CLK_TX may have a first frequency, and the second clock signal CLK_RX may have a second frequency.

The second frequency may be higher than the first frequency.

The transmitter 200 may transmit a first input signal IN1 as first data EN1 in synchronization with a first edge of the first clock signal CLK_TX.

For some embodiments, a hardware component transmitting or outputting a first signal/data A as a second signal/data B means that the hardware component receives the signal/data A and outputs the signal/data B. In some instances, the hardware component processes the signal/data A to generate the signal/data B. For example, the signal/data A may be delayed, inverted, or otherwise processed to generate the signal/data B. In other instances, the signal/data A is not so processed before the hardware component outputs the signal/data B.

The receiver 301 may output second data EN13 according to an external signal (i.e. the first data EN1 of the transmitter 200), a second input signal IN2, and the second clock signal CLK_RX.

The second input signal IN2 may have a fixed level and include a ground voltage, for example.

The receiver 301 may include first and second storage units 311 and 321.

The first storage unit 311 may receive the inverted first data EN1 as a set signal and may output the second input signal IN2 as an internal signal EN12 in synchronization with a first edge of the second dock signal CLK_RX.

The first storage unit 311 may have an input terminal D coupled to a ground terminal, an inverted set terminal SET configured to receive the first data EN1 of the transmitter 200, a clock terminal configured to receive the second clock signal CLK_RX, and an output terminal Q configured to output the internal signal EN12. Further, the first storage unit 311 may include a flip-flop. For example, the storage unit 311 represents a first flip-flop of the receiver 301.

The second storage unit 321 may output the internal signal EN12 as the second data EN13 in synchronization with a second edge of the second clock signal CLK_RX (for example, falling edge).

The second storage unit 321 may have an input terminal D configured to receive the output signal of the first storage unit 311 (i.e. the internal signal EN12), a clock terminal configured to receive the second clock signal CLK_RX, and an output terminal Q configured to generate the second data EN13.

Phase of the first edge of the first clock signal CLK_TX may be out of phase (for example, opposite) with the second edge of the second clock signal CLK_RX, and phase of the first edge of the second dock signal CLK_RX may be out of phase (for example, opposite) with the second edge of the second clock signal CLK_RX The first edge of the first clock signal CLK_TX and the first edge of the second clock signal CLK_RX may correspond to rising edges, and the second edge of the second clock signal CLK_RX may correspond to a falling edge, for example.

Hereafter, the operation of the semiconductor apparatus 101 is described with reference to FIGS. 2 and 3.

Figure 3:
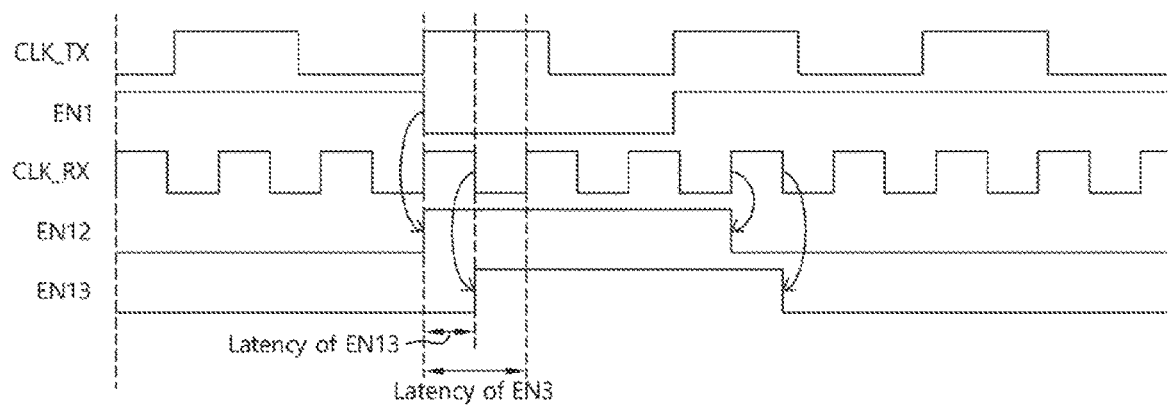
FIG. 3 illustrates a timing diagram for describing the operation of the semiconductor apparatus of FIG. 2.

FIG. 3 shows a timing diagram for describing the operation of the semiconductor apparatus 101 of FIG. 2.

FIG. 3 illustrates that the second frequency of the second clock signal CLK_RX is higher than the first frequency of the first clock signal CLK_TX.

As illustrated in FIG. 2, the input terminal D of the first storage unit 311 of the receiver 301 may be coupled to the ground terminal, and the first data EN1 of the transmitter 200 may be inputted to the inverted set terminal SET of the first storage unit 311.

Therefore, as illustrated in FIG. 3, the internal signal EN12 may be retained at a low level while the first data EN1 retains a high level.

The first data EN1 synchronized with a rising edge of the first clock signal CLK_TX may be inputted to the receiver 301.

When the first data EN1 of the transmitter 200 transitions to a low level, the internal signal EN12 may be changed to a high level by the inverted set terminal SET.

The second data EN13 may transition to a high level, according to the high-level internal signal EN12, at a falling edge of the second clock signal CLK_RX.

When the first data EN1 of the transmitter 200 transitions to a high level, the internal signal EN12 and the second data EN13 may transition to a low level at rising and falling edges of the second clock signal CLK_RX, respectively, which correspond to the next timings.

The semiconductor apparatus 101 may use the first data EN1 of the transmitter 200 as the setup signal of the first storage unit 311, and thus change the internal signal EN12 without latency caused by the second clock signal CLK_RX. Furthermore, the semiconductor apparatus 101 may generate the second data EN13 using the falling edge of a clock pulse of the second clock signal CLK_RX, corresponding to an edge of the first data EN1.

Therefore, the first data EN1 outputted from the transmitter 200 based on the first clock signal CLK_TX may be outputted through the receiver 301 after latency corresponding to half (½) a cycle of the second clock signal CLK_RX.

The above-described latency may be set to an approximate value, as indicated in FIG. 3, and may have a different value depending on a frequency difference between the first and second clock signals CLK_TX and CLK_RX.

Therefore, the semiconductor apparatus 101, in accordance with embodiments of the present teachings, can reduce the latency for generating the second data EN13, compared to the second data EN3 of the receiver 300 of the semiconductor apparatus 100 of FIG. 1, which uses two different rising edges based on the second clock signal CLK_RX.

Figure 4:
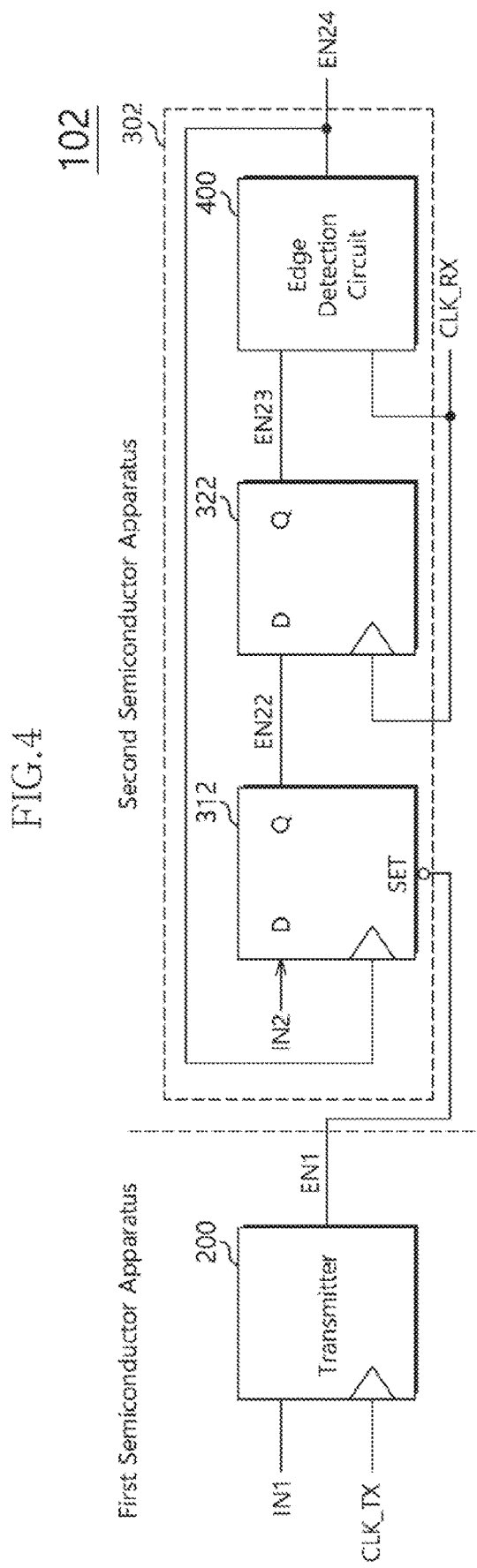
FIG. 4 illustrates a configuration of a semiconductor apparatus with a domain crossing function, in accordance with an embodiment.

FIG. 4 illustrates the configuration of a semiconductor apparatus 102 in accordance with another embodiment.

As illustrated in FIG. 4, the semiconductor apparatus 102 may include a first semiconductor apparatus and a second semiconductor apparatus.

The first semiconductor apparatus may include a transmitter 200, and the second semiconductor apparatus may include a receiver 302.

The first clock signal CLK_TX may have a first frequency, and the second clock signal CLK_RX may have a second frequency.

The first frequency may be higher than the second frequency.

The transmitter 200 may transmit a first input signal IN1 as first data EN1 in synchronization with a first edge of the first clock signal CLK_TX.

The receiver 302 may output second data EN24 according to an external signal (i.e. the first data EN1 of the transmitter 200), a second input signal IN2, and the second clock signal CLK_RX.

The second input signal IN2 may have a fixed level and include a ground voltage, for example.

The receiver 302 may include first and second storage units 312 and 322 and an edge detection circuit 400.

The first storage unit 312 may receive the inverted first data EN1 as a set signal and may output the second input signal IN2 as a first internal signal EN22 in synchronization with a first edge of the second clock signal CLK_RX.

The first storage unit 312 may have an input terminal D coupled to a ground terminal, an inverted set terminal SET configured to receive the first data EN1 of the transmitter 200, a clock terminal configured to receive the second data EN24 of the edge detection circuit 400, and an output terminal Q configured to output the first internal signal EN22.

Because the input terminal D of the first storage unit 312 is coupled to the ground terminal, the level of the output terminal Q may be cleared or reset to a low level, according to the second data EN24 of the edge detection circuit 400 inputted to the clock terminal.

The second storage unit 322 may output the first internal signal EN22 as a second internal signal EN23 in synchronization with the first edge of the second clock signal CLK_RX.

The second storage unit 322 may have an input terminal D configured to receive an output signal of the first storage unit 312 (i.e. the first internal signal EN22), a clock terminal configured to receive the second clock signal CLK_RX, and an output terminal Q configured to generate the second internal signal EN23.

The edge detection circuit 400 may generate the second data EN24 by detecting the first edge of the output signal of the second storage unit 322, i.e. the first edge of the second internal signal EN23 according to the second clock signal CLK_RX.

The first edge of the first clock signal CLK_TX, the first edge of the second clock signal CLK_RX, and the first edge of the second internal signal EN23 may be in phase with one another. In an embodiment, signals being "in phase" with one another indicates the signals are substantially in phase. Signals being substantially in phase, for example, means the signals are out of phase by no more than 5 degrees. In another embodiment, two signals are in phase when rising edges of the signals align in time.

The first edge of the first clock signal CLK_TX, the first edge of the second clock signal CLK_RX, and the first edge of the second internal signal EN23 may correspond to rising edges, for example.

Figure 5:
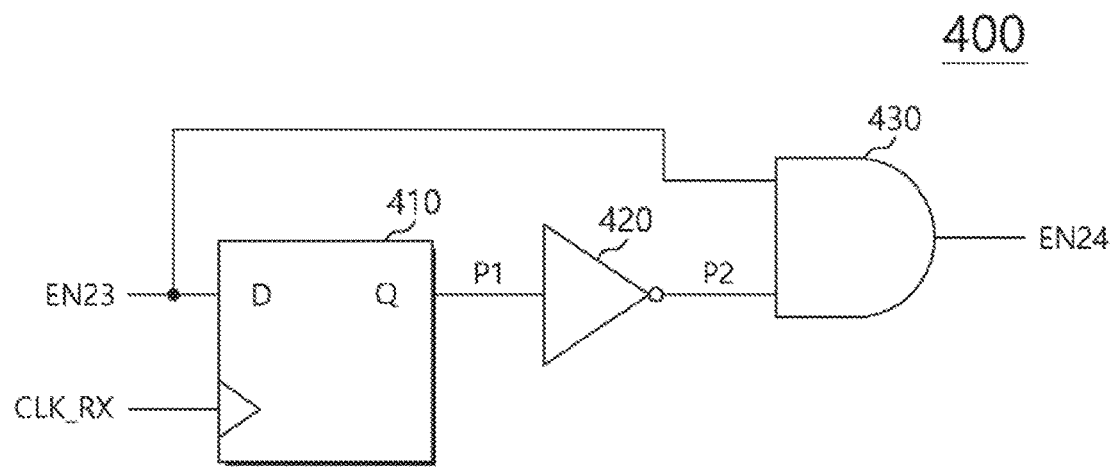
FIG. 5 illustrates a configuration of an edge detection circuit of FIG. 4, in accordance with an embodiment.

FIG. 5 illustrates a configuration of the edge detection circuit 400 of FIG. 4, in accordance with an embodiment of the present teachings.

As illustrated in FIG. 5, the edge detection circuit 400 may include a flip-flop 410, an inverter 420, and a logic gate 430.

The flip-flop 410 may generate an output signal P1 (also referred to as a latched second internal signal) by latching the second internal signal EN23 according to the second clock signal CLK_RX.

The inverter 420 may generate an output signal P2 (also referred to as an inverted latched second internal signal) by inverting the output signal P1 of the flip-flop 410.

The logic gate 430 may generate the second data EN24 by performing a logical AND operation on the second internal signal EN23 and the output signal P2 of the inverter 420.

The operation of the semiconductor apparatus 102, in accordance with an embodiment, is described with reference to FIGS. 4 to 6.

Figure 6:
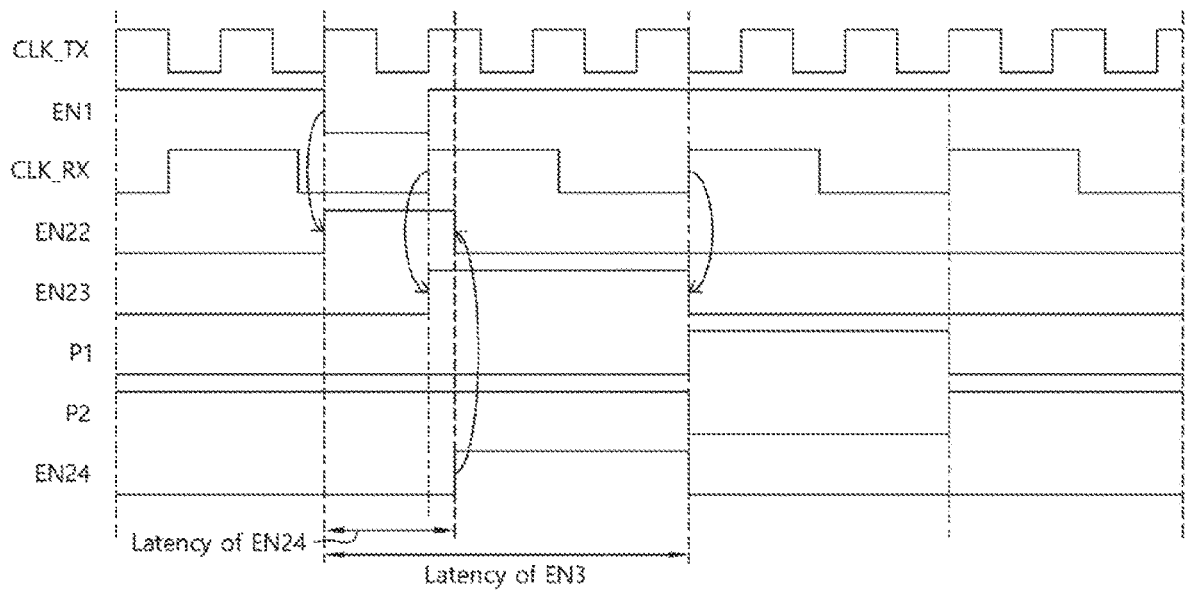
FIG. 6 illustrates a timing diagram for describing the operation of the semiconductor apparatus of FIG. 4.

FIG. 6 shows a timing diagram for describing the operation of the semiconductor apparatus of FIG. 4.

FIG. 6 illustrates that the first frequency of the first dock signal CLK_TX is higher than the second frequency of the second clock signal CLK_RX.

As illustrated in FIG. 4, the input terminal D of the first storage unit 312 of the receiver 302 may be inputted the ground voltage as the second input signal IN2, and the first data EN1 of the transmitter 200 may be inputted to the inverted set terminal SET of the first storage unit 312.

Therefore, as illustrated in FIG. 6, the first internal signal EN22 may be retained at a low level while the first data EN1 retains a high level.

The first data EN1 synchronized with a rising edge of the first clock signal CLK_TX may be inputted to the receiver 302.

When the first data EN1 of the transmitter 200 transitions to a low level, the first internal signal EN22 may be changed to a high level by the inverted set terminal SET.

The second internal signal EN23 may transition to a high level, according to the high-level first internal signal EN22, at a falling edge of the second clock signal CLK_RX.

The second data EN24 may transition to a high level, according to the detected high-level second internal signal EN23, by the edge detection circuit 400.

The first internal signal EN22 may transition to a low level according to the high-level data EN24.

When the first data EN1 of the transmitter 200 transitions to a high level, the second internal signal EN23 may transition to a low level at next timing rising edge of the second clock signal CLK_RX.

The flip-flop 410 of the edge detection circuit 400 may generate the output signal P1 by latching the second internal signal EN23 according to the second clock signal CLK_RX.

The inverter 420 of the edge detection circuit 400 may generate the output signal P2 by inverting the output signal P1 of the flip-flop 410.

The logic gate 430 of the edge detection circuit 400 may generate the second data EN24 by performing an AND operation on the second internal signal EN23 and the output signal P2 of the inverter 420.

The second data EN24 may be delayed in comparison to the second internal signal EN23 due to the internal signal processing delay of the edge detection circuit 400.

Because the ground voltage is inputted to the input terminal D of the first storage unit 312, the level of the output terminal Q (i.e. the first internal signal EN22) may be reset to a low level, according to the second data EN24 of the edge detection circuit 400, inputted to the dock terminal.

FIG. 6 illustrates that the first frequency of the first clock signal CLK_TX is higher than the second frequency of the second clock signal CLK_RX.

That is, because the signal processing of the transmitter side may be performed at higher speed than in the receiver side, the receiver 302, in some instances, needs to be ready for quickly responding to a signal input following the latest signal input of the transmitter 200.

Therefore, the second data EN24 of the edge detection circuit 400 may be fed back to the clock terminal of the first storage unit 312, in order to reset to the first internal signal EN22 almost at the same timing as the generation of the second data EN24. Then, the next signal can be stably received.

The semiconductor apparatus 102, in accordance with an embodiment, may use the first data EN1 of the transmitter 200 as the setup signal of the first storage unit and may change the first internal signal EN22 without latency caused by the second clock signal CLK_RX. Furthermore, the semiconductor apparatus 102 may feed back the second data EN24 to the first storage unit 312, in order for the semiconductor apparatus 102 to stably receive the next signal.

The first data EN1 outputted from the transmitter 200, based on the first clock signal CLK_TX, may be outputted through the receiver 302 after latency corresponding to half (½) a cycle of the second clock signal CLK_RX.

The above-described latency may be set to an approximate value based on FIG. 6 and may have a different value depending on a frequency difference between the first and second clock signals CLK_TX and CLK_RX.

Therefore, the semiconductor apparatus 102 in accordance with the present embodiment can reduce the latency for generating the second data EN24 in comparison to the second data EN3 of the receiver 300 of the clock domain crossing circuit 100 in FIG. 1, which uses two different rising edges based on the second clock signal CLK_RX. Furthermore, even when the clock frequency of the receiver side is high, the semiconductor apparatus 102 can stably receive successive signals.

It will be understood by those skilled in the art that described embodiments represent only a limited number of possible embodiments consistent with the present teachings. Accordingly, a semiconductor apparatus consistent with the present teachings should not be limited to or based on the described embodiments.

What is claimed is:

1. A semiconductor apparatus comprising:
    a first semiconductor apparatus configured to transmit a first input signal as first data in synchronization with a first clock signal having a first frequency; and
    a second semiconductor apparatus comprising:
    a first storage unit configured to receive a second input signal, receive the first data as a set signal and output the second input signal as an internal signal in synchronization with a second clock signal having a second frequency; and
    a second storage unit configured to output the internal signal as second data in synchronization with an inverted signal of the second clock signal.

2. The semiconductor apparatus according to claim 1, wherein the second frequency is higher than the first frequency.

3. The semiconductor apparatus according to claim 1, wherein a voltage level of the second input signal is fixed.

4. The semiconductor apparatus according to claim 1, wherein the first storage unit comprises a flip-flop and receives the first data through an inverted set terminal of the flip-flop.

5. A semiconductor apparatus comprising:
    a first semiconductor apparatus configured to transmit a first input signal as first data in synchronization with a first edge of a first clock signal having a first frequency; and
    a second semiconductor apparatus configured to generate a second data according to the first data, a second input signal and the second data,
    wherein the second semiconductor apparatus comprises:
    a first storage unit configured to receive the second input signal, receive the first data as a set signal and output the second input signal as a first internal signal in synchronization with a first edge of the second data;
    a second storage unit configured to output the first internal signal as a second internal signal in synchronization with a first edge of a second clock signal having a second frequency; and
    an edge detection circuit configured to generate the second data by detecting a first edge of the second internal signal according to the second clock signal.

6. The semiconductor apparatus according to claim 5, wherein the first frequency is higher than the second frequency.

7. The semiconductor apparatus according to claim 5, wherein a voltage level of the second input signal is fixed.

8. The semiconductor apparatus according to claim 5, wherein the first storage unit comprises a flip-flop and receives the first data through an inverted set terminal of the flip-flop.

9. The semiconductor apparatus according to claim 5, wherein the first edge of the first clock signal and the first edge of the second clock signal are in phase with each other.

10. The semiconductor apparatus according to claim 5, wherein the edge detection circuit comprises:
    a flip-flop configured to latch the second internal signal according to the second clock signal to output a latched second internal signal;
    an inverter configured to invert the latched second internal signal to output an inverted latched second internal signal; and
    a logic gate configured to generate the second data by performing a logical AND operation on the second internal signal and the inverted latched second internal signal.

* * * * *